Feb. 10, 1925.
H. M. KING, JR
WHEEL LUG
Filed May 15, 1923
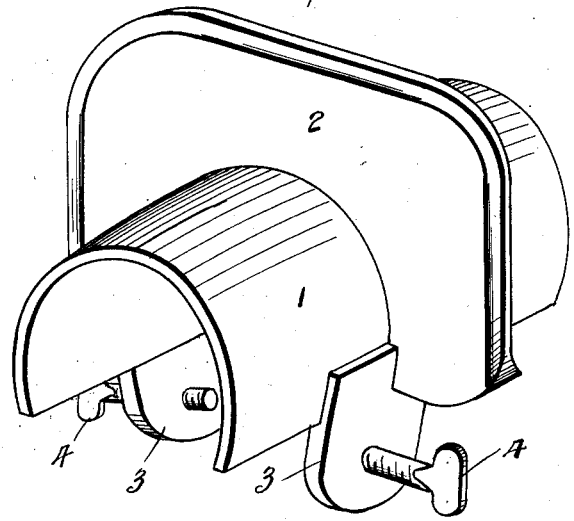
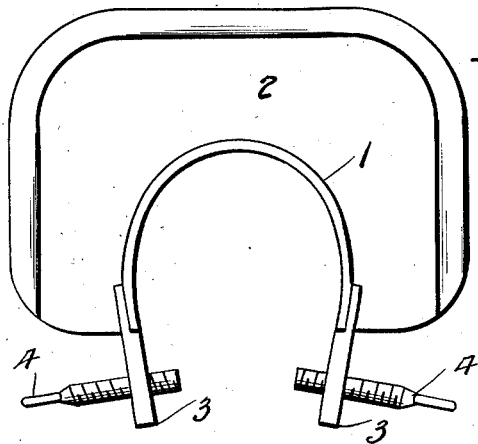
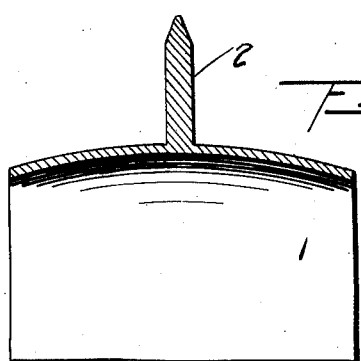
Inventor
H. M. King, Jr.

Patented Feb. 10, 1925.

1,525,779

UNITED STATES PATENT OFFICE.

HARRIS M. KING, JR., OF SAVANNAH, GEORGIA.

WHEEL LUG.

Application filed May 15, 1923. Serial No. 639,140.

*To all whom it may concern:*

Be it known that I, HARRIS M. KING, Jr., a citizen of the United States, residing at Savannah, in the county of Chatham and State of Georgia, have invented certain new and useful Improvements in Wheel Lugs; and I do hereby declare the following to be a full, clear, and exact description of the invention, such as will enable others skilled in the art to which it appertains to make and use the same.

The primary object of this invention is to prevent slipping of a vehicle wheel, whereby to guard against skidding and to insure a drive wheel obtaining sufficient tractive force to propel a vehicle over a sandy stretch of road, or a slippery or muddy surface.

The invention consists of a shoe adapted to be attached to the wheel or tire, said shoe extending across the tread and along opposite sides of the wheel and embodying a cleat which is adapted to penetrate a soft or sandy surface or engage a wet or slippery surface in a manner to prevent slipping, thereby operating as an antiskid device and as a traction lug whereby to enable a motor vehicle to pull itself out of a rut or a stretch of mud or sand.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of a wheel lug embodying the invention,

Figure 2 is an end view thereof, and

Figure 3 is a central longitudinal section.

Corresponding and like parts are referred to in the following description and designated in the several views of the drawings by like reference characters.

The device comprises a shoe 1 which may be of any length and substantially of U-form in end view. A cleat 2 is disposed transversely of the shoe and extends outwardly from the tread at opposite sides thereof so as to penetrate sand and soft places in the road or engage a wet and slippery surface in a manner to prevent slipping. Ears 3 project from opposite longitudinal edges of the shoe and are disposed midway the ends thereof and in the plane of the cleat 2 which latter is located centrally of the device. Clamp screws 4 are threaded into the ears 3 and operate as means to secure the device to the wheel of a motor vehicle. It is observed that the device is of such construction that it may be readily attached to disk wheels, as well as other types of wheels. The device may be cast or formed in any approved and desired way and will be constructed of such material as best adapted to resist wear and insure a light and neat structure.

What is claimed is:

1. A wheel lug comprising a shoe of substantially U-form throughout its length and having a centrally disposed cleat upon its outer side extending across the tread and along opposite sides thereof, and having ears projecting from opposite edges and disposed in the plane of the cleat, and clamp screws having screw thread engagement with said ears and operating as attaching means for directly engaging and securing the device to the wheel of a motor vehicle.

2. A wheel lug comprising a shoe of substantially U-shape in cross section, a cleat extending outwardly from the shoe and having its lower edges in the same plane as the longitudinal edges of the shoe, ears extending from the shoe and below said edges, the inner surfaces of said ears being flush with the inner surface of the shoe, and the outer surface of the ears being outwardly beyond the outer surface of the shoe and extending above said edges to provide a reinforced structure, and attaching screws threaded in said ears below said shoe and adapted for direct engagement with a wheel to secure the device thereto.

In testimony whereof I affix my signature in presence of two witnesses.

HARRIS M. KING, JR.

Witnesses:
F. A. WATERS,
NAN B. BAKER.